(12) United States Patent
Ishii et al.

(10) Patent No.: US 10,458,847 B2
(45) Date of Patent: Oct. 29, 2019

(54) METHOD AND SYSTEM FOR EVALUATING PERFORMANCE OF IMAGE DISPLAY DEVICE

(71) Applicant: IMAGICA Lab. Inc., Shinagawa-ku (JP)

(72) Inventors: Ado Ishii, Shinagawa-ku (JP); Wataru Matsumoto, Shinagawa-ku (JP); Toshiki Yura, Shinagawa-ku (JP); Tomohiro Hasegawa, Shinagawa-ku (JP)

(73) Assignee: IMAGICA Lab. Inc., Shinagawa-ku (JP)

( * ) Notice: Subject to any disclaimer, the term of this patent is extended or adjusted under 35 U.S.C. 154(b) by 0 days.

(21) Appl. No.: 16/089,458

(22) PCT Filed: Jan. 26, 2017

(86) PCT No.: PCT/JP2017/002817
§ 371 (c)(1),
(2) Date: Sep. 28, 2018

(87) PCT Pub. No.: WO2017/175455
PCT Pub. Date: Oct. 12, 2017

(65) Prior Publication Data
US 2019/0056271 A1    Feb. 21, 2019

(30) Foreign Application Priority Data
Apr. 6, 2016  (JP) .................................. 2016-076290

(51) Int. Cl.
*G01J 3/46*    (2006.01)
*G01M 11/00*    (2006.01)
(Continued)

(52) U.S. Cl.
CPC .................. *G01J 3/46* (2013.01); *G01J 3/506* (2013.01); *G01M 11/00* (2013.01); *H04N 17/02* (2013.01);
(Continued)

(58) Field of Classification Search
CPC .. G01J 3/46; G01J 3/506; G01J 3/465; G01M 11/00; H04N 17/02; H04N 17/04; G09G 3/006
See application file for complete search history.

(56) References Cited

U.S. PATENT DOCUMENTS

2008/0297604 A1    12/2008 Imai et al.

FOREIGN PATENT DOCUMENTS

| JP | 2003-16443 A | 1/2003 | |
| JP | 2003016443 A * | 1/2003 | ................ G01J 3/46 |

(Continued)

OTHER PUBLICATIONS

International Search Report dated Apr. 18, 2017, in PCT/JP2017/002817, filed Jan. 26, 2017.
(Continued)

*Primary Examiner* — Jamil Ahmed
(74) *Attorney, Agent, or Firm* — Oblon, McClelland, Maier & Neustadt, L.L.P.

(57) ABSTRACT

A luminance evaluation image 1 has a determination portion 3 configured such that luminance changes progressively between low and high luminance regions 3a and 3b defined to have luminance levels lower and higher than an upper limit of luminance displayable on the image display device 4, respectively. A chromaticity evaluation image has a determination portion configured such that chroma changes progressively between low and high chroma regions defined to have chroma levels lower and higher than an upper limit of chroma displayable on the image display device 4,
(Continued)

respectively. At least either the luminance evaluation image or chromaticity evaluation image is displayed on the image display device 4 to evaluate characteristics of the image display device 4 from a position of a boundary B1 in the determination portion 3.

6 Claims, 11 Drawing Sheets
(2 of 11 Drawing Sheet(s) Filed in Color)

(51) Int. Cl.
    *H04N 17/04*     (2006.01)
    *G01J 3/50*     (2006.01)
    *H04N 17/02*     (2006.01)
    *G09G 3/00*     (2006.01)

(52) U.S. Cl.
    CPC .............. *H04N 17/04* (2013.01); *G01J 3/465* (2013.01); *G09G 3/006* (2013.01)

(56) References Cited

FOREIGN PATENT DOCUMENTS

| JP | 2008-301452 A | 12/2008 |
|---|---|---|
| JP | 2010-252144 A | 11/2010 |

OTHER PUBLICATIONS

The Society of Motion Picture and Television Engineers, "SMPTE ST 2084—High Dynamic Range Electro-Optical Transfer Function of Mastering Reference Displays", 2014, pp. 1-14.

Association of Radio Industries and Businesses, "Essential Parameter Values for the Extended Image Dynamic Range Television (EIDRTV) System for Programme Production", ARIB STD-B67, Jul. 3, 2015, 12 pages.

International Telecommunication Union, Parameter Values for Ultra-High Definition Television Systems for Production and International Programme Exchange, Recommendation ITU-R BT.2020-2, Oct. 2015, 8 pages.

* cited by examiner

METHOD AND SYSTEM FOR EVALUATING PERFORMANCE OF IMAGE DISPLAY DEVICE

TECHNICAL FIELD

The present invention relates to a method and a system for evaluating display performance such as a luminance gradation range and a chromaticity range of an image display device.

BACKGROUND ART

Various attempts have been made to attain high image quality of a video displayed on an image display device. Besides resolution, luminance and chromaticity are used as criteria for expressing a quality of the video. In recent years, standards such as so-called HDR (High Dynamic Range) and XDR (X-tended Dynamic Range) have been suggested as standards for defining a luminance gradation having a range wider than ever; for example, the former includes SMPTE ST2084 as a standard and the latter includes a standard such as ARIB STD-B67 (see Non Patent Literatures 1 and 2 described below). Furthermore, for example, ITU-R BT.2020 has been proposed as a standard with a color gamut expanded more than ever (see Non Patent Literature 3 described below).

These standards widely define video signals as faithfully as possible to a recorded original video so as to minimize compression of information such as luminance or chromaticity of the video whereas image display devices are often unable to fully cover video signals extending over such a wide domain of definition due to technical difficulties. Even when trying to display a video based on video signals according to the aforementioned standards on an image display device, luminance and chromaticity are reproduced only within a range of display performance of the image display device in the video actually displayed. In addition, image display devices have individual differences. Thus, in order to grasp a level of performance actually provided by a certain image display device with respect to each of the standards mentioned above, there is a necessity of displaying a video on the image display device to individually measure luminance or chroma thereof.

Such a measurement may be manually performed by using a luminance or chromaticity meter. When displayable luminance is to be measured on a certain image display device, for example, a test pattern is displayed on a screen of the target image display device and luminance of the screen is measured; thus, luminance may be grasped as a numerical value. As regards a color range, for example, several kinds of color test patterns on single colors are displayed and the chromaticity of the screen is measured with a chromaticity meter; thus, characteristics on display of colors may be grasped.

CITATION LIST

Non Patent Literature

Non Patent Literature 1: The Society of Motion Picture and Television Engineers: SMPTE ST 2084—High Dynamic Range Electro-Optical Transfer Function of Mastering Reference Displays (2014)
Non Patent Literature 2: Association of Radio Industries and Businesses: Essential Parameter Values for the Extended Image Dynamic Range Television (EIDRTV) System for Programme Production (2015) [online] http://www.arib.or.jp/english/html/overview/doc/2-STD-B67v1_0.pdf
Non Patent Literature 3: International Telecommunication Union: Parameter Values for Ultra-High Definition Television Systems for Production and International Programme Exchange (2015) [online] https://www.itu.int/dms_pubrec/itu-r/rec/bt/R-REC-BT.2020-2-201510-I!!PDF-E.pdf

SUMMARY OF INVENTION

Technical Problem

However, such manual measurement is time-consuming and troublesome and needs special measuring devices such as luminance and chromaticity meters. Thus, a method and a system have been desired which enables evaluation of performance of an image display device with simpler procedures.

The invention was made in view of the above and is directed to provide a method and a system for evaluating performance of an image display device that enables simple and intuitive evaluation of the performance of the image display device.

Solution to Problems

The invention is directed to a method for evaluating performance of an image display device which comprises displaying at least either a luminance evaluation image or a chromaticity evaluation image on said image display device, said luminance evaluation image having a determination portion configured such that luminance changes progressively between a low luminance region defined to have luminance levels lower than an upper limit of luminance displayable on said image display device and a high luminance region defined to have luminance levels higher than the upper limit of luminance displayable on said image display device, said chromaticity evaluation image having a determination portion configured such that chroma changes progressively between a low chroma region defined to have chroma levels lower than an upper limit of chroma displayable on said image display device and a high chroma region defined to have chroma levels higher than the upper limit of chroma displayable on said image display device; and evaluating characteristics of the image display device from a position of a boundary of the luminance saturation region in the determination portion of said luminance evaluation image or of the chroma saturation region in the determination portion of said chromaticity evaluation image.

Thus, in this manner, the performance of the image display device can be grasped in the form of the position of the boundary.

In the method for evaluating performance according to the invention, said luminance evaluation image may be defined by SMPTE ST2084 or ARIB STD-B67, which makes it possible to define said luminance evaluation image in a wide luminance range and favorably evaluate display performance on the luminance of the image display device.

In the method for evaluating performance according to the invention, said chromaticity evaluation image may be defined by ITU-R BT.2020, which makes it possible to define said chromaticity evaluation image in a wide color gamut and favorably evaluate display performance on the chromaticity of the image display device.

The invention is also directed to a system for evaluating performance of an image display device which is configured to execute the aforementioned method for evaluating the performance of the image display device.

Advantageous Effect of Invention

A method and a system for evaluating performance of an image display device according to the invention can exert a remarkable effect of enabling simple and intuitive evaluation of the performance of the image display device.

BRIEF DESCRIPTION OF DRAWINGS

The patent or application file contains at least one drawing executed in color. Copies of this patent or patent application publication with color drawing(s) will be provided by the Office upon request and payment of the necessary fee.

DESCRIPTION OF EMBODIMENT

Hereinafter, an embodiment of the invention will be disclosed in conjunction with the attached drawings.

FIGS. 1-16 show a method and a system for evaluating performance of an image display device in the embodiment of the invention.

Figure 1:
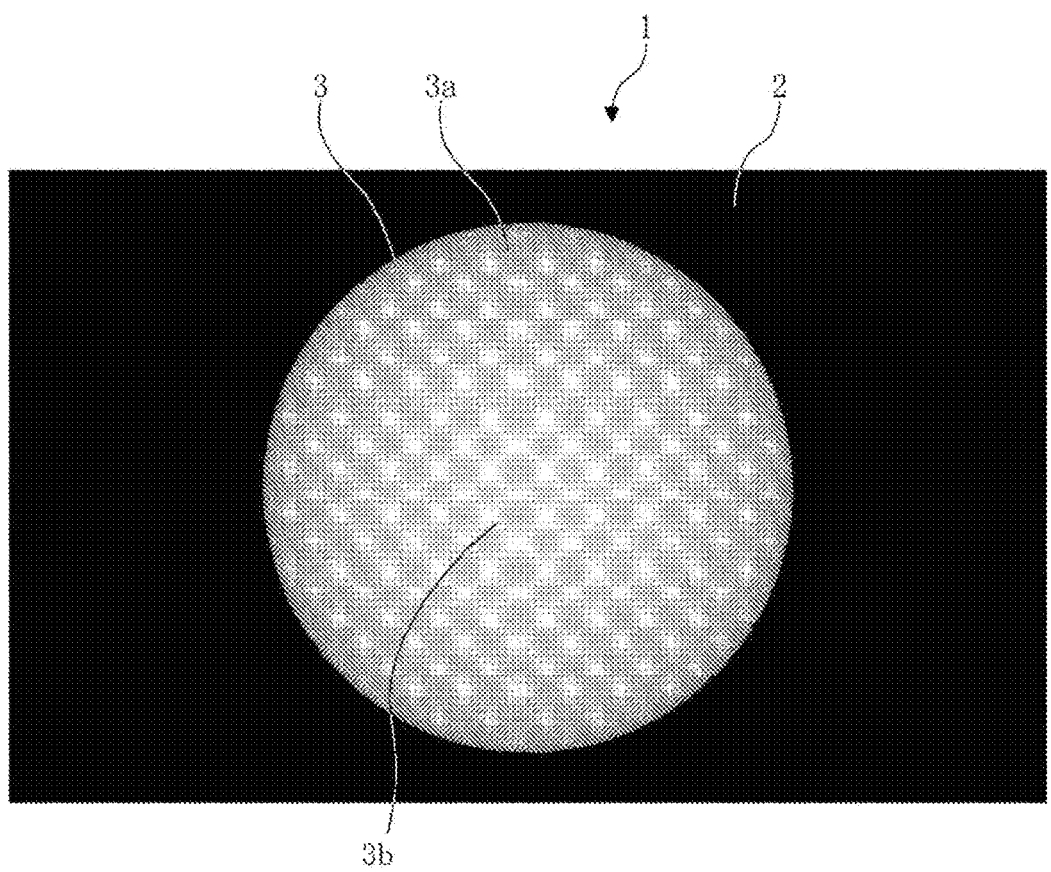
FIG. 1 is a schematic view showing an example of a luminance evaluation image used in an embodiment of the invention.

FIG. 1 schematically shows an example of an image (luminance evaluation image) displayed on the image display device in the embodiment so as to evaluate display performance on luminance of the image display device. A luminance evaluation image 1 is formed by placing a determination portion 3 with luminance changing progressively from a low luminance region 3a to a high luminance region 3b, on a background 2 with luminance defined as zero.

In the embodiment, the determination portion 3 is circular, is placed centrally on the background 2 and is displayed gradually brighter from an outer circumference as the low luminance region 3a toward a central part as the high luminance region 3b. The determination portion 3 is not colored and is defined as regions having black to gray to white.

Figure 2:
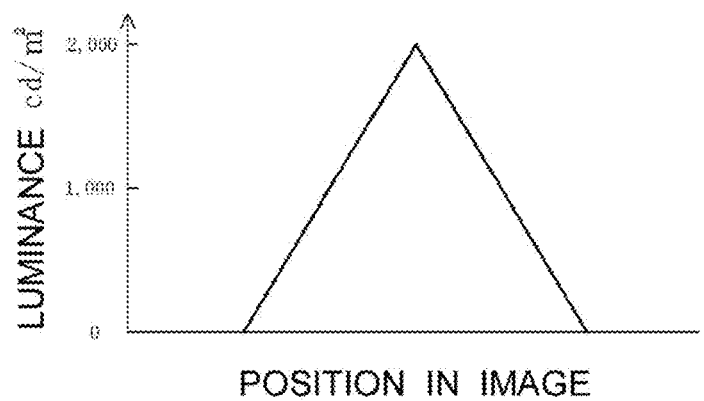
FIG. 2 is a graph illustrating luminance distribution defined in the luminance evaluation image used in the embodiment.

FIG. 2 shows luminance distribution in the luminance evaluation image 1. A virtual straight line passing through a center of the determination portion 3 is plotted on an abscissa, and the luminance along the straight line is plotted on an ordinate. In the luminance evaluation image 1 of the embodiment, the luminance is defined as 0 $cd/m^2$ in the background 2, increases linearly in the determination portion 3 from the outer circumference toward the central part by, for example, 2 $cd/m^2$ per pixel starting from 0 $cd/m^2$, and is defined as 2,000 $cd/m^2$ at the central part which is the maximum luminance.

The luminance evaluation image 1 shown in FIG. 1 schematically shows an image defined by video signals and, in other words, shows how the luminance evaluation image 1 looks when displayed on a virtual image display device capable of displaying an image faithfully to the definition by video signals. An actually existing image display device often displays the image in a way different from that in FIG. 1.

Specifically, the luminance evaluation image 1 as mentioned above is defined by a standard capable of defining a wide luminance range such as SMPTE ST2084 or ARIB STD-B67 while many of current image display devices, particularly image display devices for general households, have an upper limit of actually displayable luminance that is not so high due to technical difficulties. For example, SMPTE ST2084 can define a luminance range of 0.01 to 10,000 $cd/m^2$ whereas the limit of luminance that current image display devices for household use can display is, for example, around 1,000 $cd/m^2$. ARIB STD-B67 can define a relative luminance range up to 1200% when the luminance range defined by a conventional standard is regarded as 100%. Thus, an image display device with usually conceivable performance has difficulty in reproducing the luminance of a video faithfully thereto.

Figure 3:
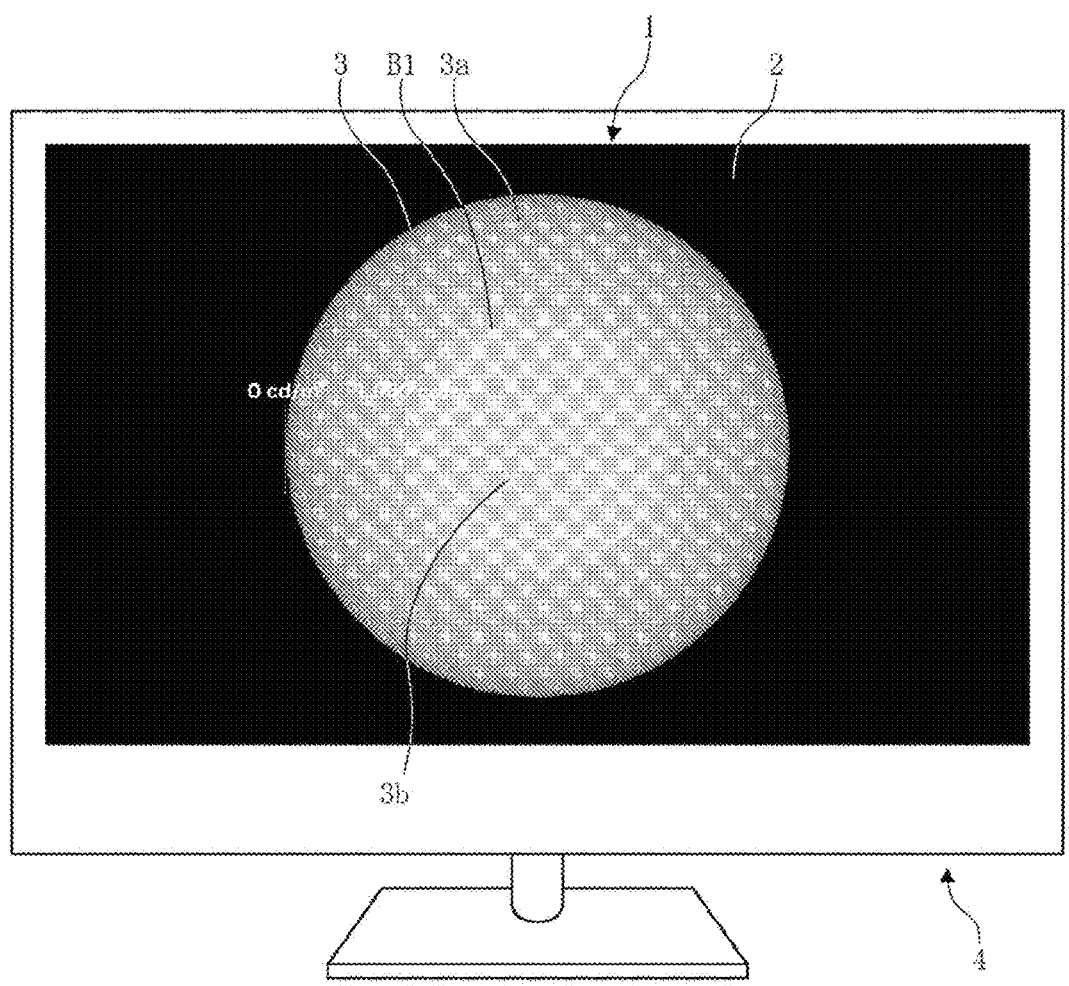
FIG. 3 is a schematic view showing how the luminance evaluation image used in the embodiment looks when displayed on an image display device.

How the luminance evaluation image 1 looks when actually displayed on such an image display device 4 is shown in FIG. 3. Exemplified here is a case where the luminance evaluation image 1 is displayed on the image display device 4 capable of displaying luminance up to 1,000 $cd/m^2$.

Figure 4:
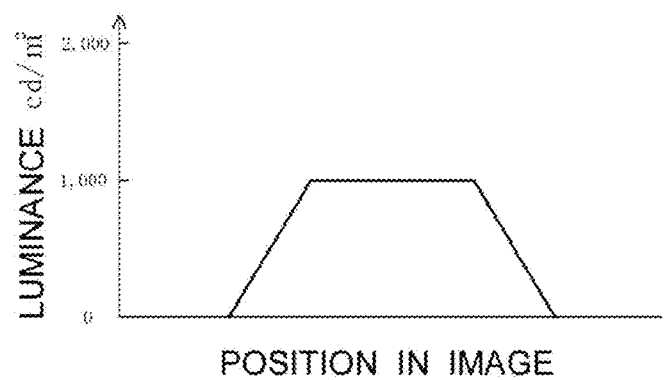
FIG. 4 is a graph illustrating luminance distribution when the luminance evaluation image used in the embodiment is displayed on the image display device.

As mentioned above, in the luminance evaluation image 1, luminance from 0 $cd/m^2$ to 2,000 $cd/m^2$ is distributed along a radial direction of the determination portion 3. In contrast, the image display device 4 can only display luminance up to 1,000 $cd/m^2$ at a maximum. Thus, in the circular determination portion 3, a position of luminance defined as 1,000 $cd/m^2$ is regarded as a boundary B1 and a portion on the low luminance region 3a side, which is outside of the boundary B1, is displayed such that the luminance is progressive. However, in a portion on the high luminance region 3b side, which is inside of the boundary B1, video signals with any brighter luminance are clipped due to luminance saturation, and the region is displayed as if it were filled only with white resulting from the maximum luminance (1,000 cd/m$^2$) displayable on the image display device 4. That is, in the actual image display device 4, the luminance within the luminance evaluation image 1 shows distribution as shown in FIG. 4. Thus, by visually observing the luminance evaluation image 1 displayed on the image display device 4, the upper limit of luminance displayable on the image display device 4 can be visually grasped as a position of the boundary B1 in the determination portion 3.

Figure 5:
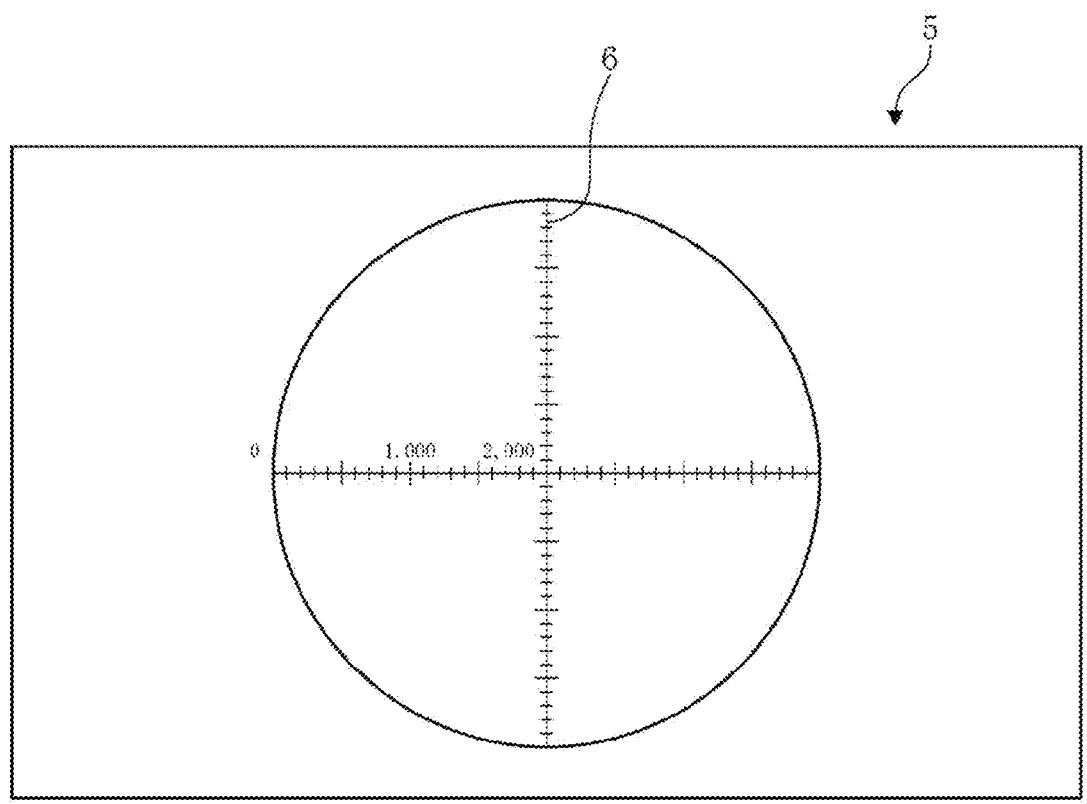
FIG. 5 is a view showing an example of a scale used in the embodiment.

However, mere visual observation of the luminance evaluation image 1 as shown in FIG. 3 does not provide grasp of the upper limit of the luminance as a numerical value. Then, after the position of the boundary B1 is grasped, for example, a scale 5 as shown in FIG. 5 is superimposed on the luminance evaluation image 1. The scale 5 is marked with scale marks 6 corresponding to luminance distribution in the determination portion 3 of the luminance evaluation image 1 so that a value of luminance corresponding to the position of the boundary B1 (see FIG. 3) can be determined.

The scale 5 is, for example, in the form of a transparent sheet with the scale marks 6 printed thereon. The sheet is superimposed on the screen of the image display device 4 so that luminance corresponding to the position of the boundary B1 can be read from the scale marks 6. Alternatively, the scale 5 may be configured, for example, as image data displayable superimposedly on the luminance evaluation image 1 by an operation of a user after the position of the boundary B1 is grasped. If the luminance evaluation image 1 were displayed from the very start in a state with the scale 5 superimposed thereon, an optical illusion might occur or determination of the boundary B1 might become difficult due to a difference in luminance between the scale marks 6 and the determination portion 3; thus, the scale 5 is preferably superimposed on the luminance evaluation image 1 after the position of the boundary B1 is grasped. Alternatively, instead of superimposition on the luminance evaluation image 1, the scale 5 prepared as a separate image with the scale marks 6 may be displayed by switching the display after the position of the boundary B1 in the luminance evaluation image 1 is grasped.

Figure 6:
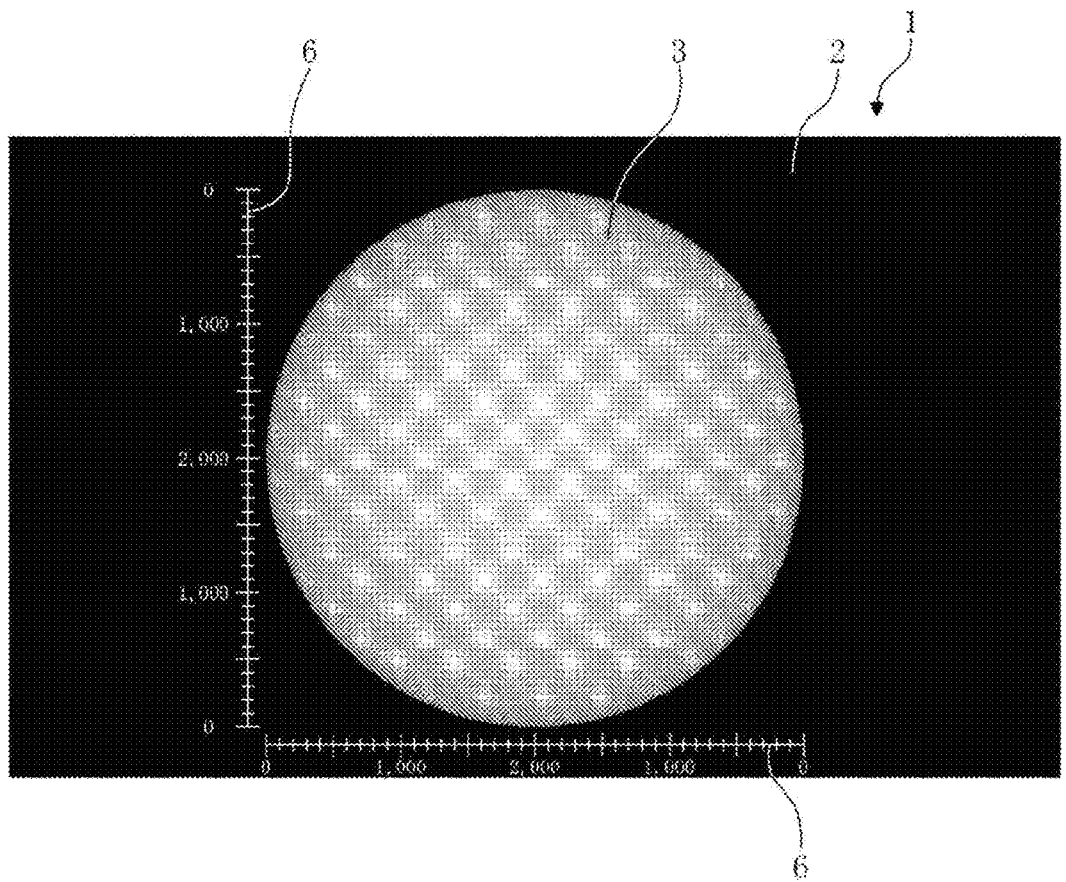
FIG. 6 is a view showing the example of the luminance evaluation image when displayed together with scale marks.

Alternatively, as shown in FIG. 6, the scale marks 6 may be displayed on the luminance evaluation image 1 in advance as long as the scale marks 6 do not overlap with the determination portion 3. In this case, the luminance evaluation image 1 doubles as the scale 5. Alternatively, without using a sheet or an image of the scale 5, a measurer may use a ruler or the like (not shown) on the screen of the image display device 4 to numerically grasp the position of the boundary B1 and properly convert the same into a numerical value to obtain the upper limit of luminance displayable on the image display device 4.

Figure 7:
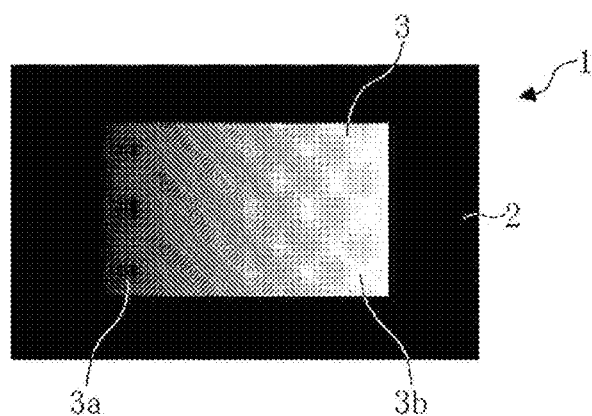
FIG. 7 is a schematic view showing a further example of the luminance evaluation image used in the embodiment.

Though the description has been made on the circular determination portion 3 with the outer circumference being the low luminance region 3a and the central part being the high luminance region 3b, the configuration of the determination portion 3 is not limited to that in the example illustrated. For example, a shape of the whole of the determination portion 3 may be a rectangle as shown in FIG. 7 or may be other various shapes such as an ellipse and a triangle. The luminance evaluation image 1 as a whole may be used as the determination portion 3. Though the luminance distribution changes along a direction from the outer circumference to the center in the example shown in FIG. 1, the distribution is not limited to that shown in the example; configuration may be made such that the luminance changes along a horizontal direction as shown in FIG. 7.

Figure 8:
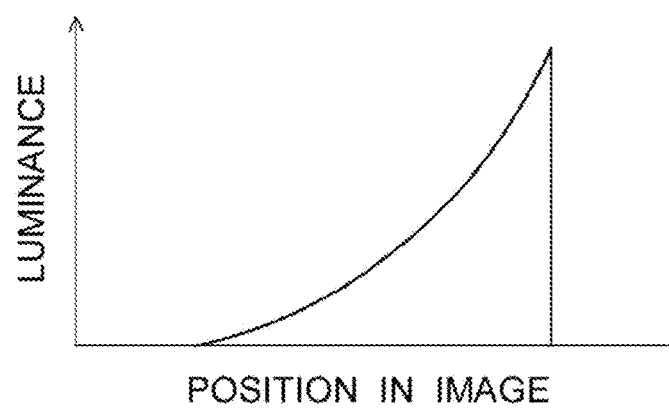
FIG. 8 is a graph illustrating luminance distribution defined in the further example of the luminance evaluation image used in the embodiment.

Though the aforementioned example has been described with respect to the case where the luminance changes linearly as shown in FIG. 2, the luminance may change, for example, with a curved inclination as shown in FIG. 8. The curve may take various kinds of shapes such as a sine curve, an exponential curve and a parabola.

Though the aforementioned example has been described with respect to the case where luminance changes from 0 cd/m$^2$ to 2,000 cd/m$^2$ in the determination portion 3, the lower and upper limits of the luminance defined in the determination portion 3 do not necessarily have to be such values. The lower limit only needs to be set to a value lower than the upper limit of luminance displayable by the image display device 4, and the upper limit only needs to be set to a value higher than the upper limit of luminance displayable by the image display device 4.

In the above, the example described has the luminance of the luminance evaluation image 1 defined by an absolute value and the display performance of the image display device 4 is evaluated as an absolute value based on the definition. Alternatively, the display performance of the image display device 4 may be evaluated as described above by using the luminance evaluation image 1 defined by a relative value. Specifically, when the luminance evaluation image 1 is defined by a standard such as SMPTE ST2084 using an absolute value, the display performance of the image display device 4 is evaluated by an absolute value as mentioned above. However, when using the evaluation image 1 defined by a standard such as ARIB STD-B67 using a relative value, then the display performance of the image display device 4 is evaluated using a relative value such as "50% of the domain of definition of ARIB STD-B67"; in this case, it is of course that scale marks 10 for a corresponding scale 9 are to be displayed using relative values.

Thus, the determination portion 3 may have any shape or luminance distribution as long as the upper limit of luminance displayable on the image display device 4 can be grasped as the position of the boundary B1. Specifically, the upper limit of luminance displayable on the image display device 4 can be grasped as the position of the boundary B1 in the determination portion 3 as long as the low luminance region 3a is defined to have luminance levels lower than the upper limit of luminance displayable on the image display device 4, the high luminance region 3b is defined to have luminance levels higher than the upper limit of luminance displayable on the image display device 4 and the luminance is defined to change progressively between the low luminance region 3a and the high luminance region 3b.

Figure 9:
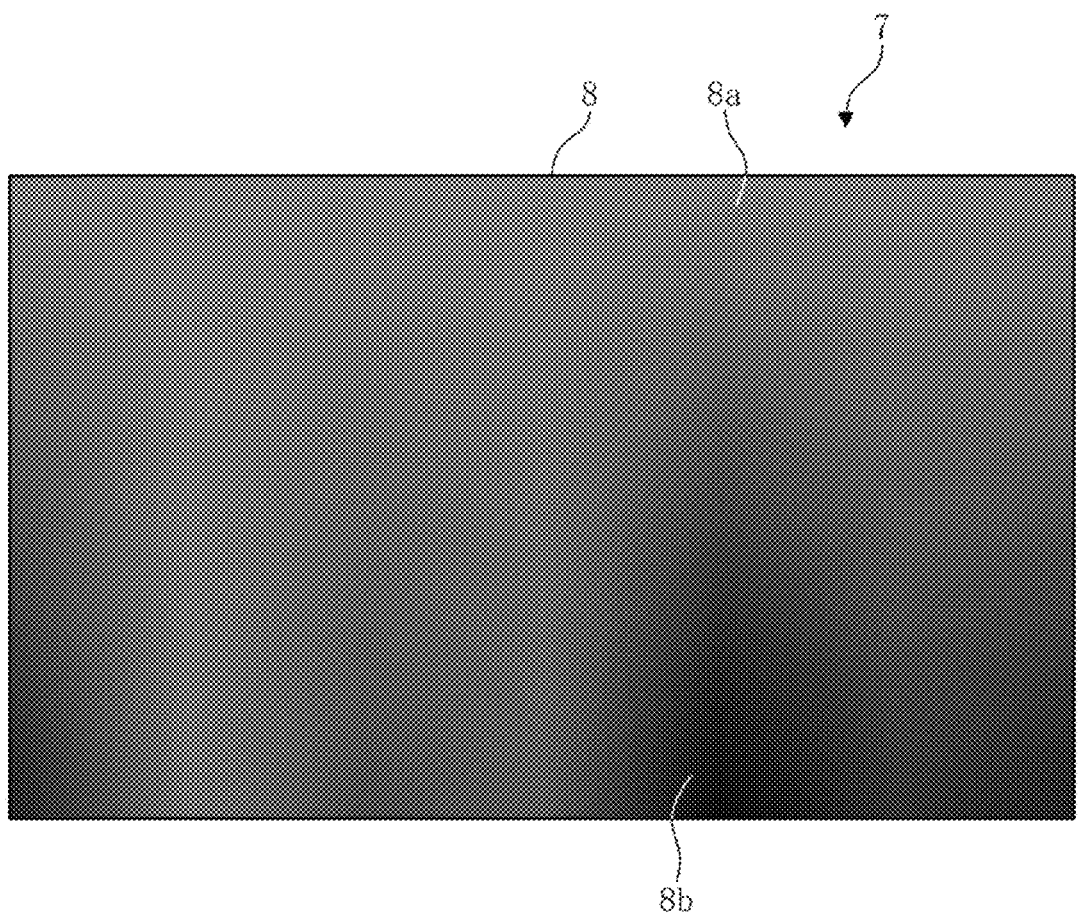
FIG. 9 is a schematic view showing an example of a chromaticity evaluation image used in the embodiment.

FIG. 9 schematically shows an example of an image (chromaticity evaluation image) displayed on the image display device for evaluating display performance regarding chromaticity of the image display device in the embodiment. A chromaticity evaluation image 7 includes a rectangular determination portion 8 in which hues and chroma change along a horizontal axis and a vertical axis, respectively. Though the entire chromaticity evaluation image 7 is used as the determination portion 8 in the embodiment, the chromaticity evaluation image 7 may be configured such that only a partial region thereof is used as the determination portion 8, as in the aforementioned luminance evaluation image 1 (see FIG. 1).

In the chromaticity evaluation image 7 shown, the determination portion 8 is defined such that a hue changes continuously from R to G to B to R along the horizontal direction and the chroma changes progressively along the vertical direction. The chroma is the lowest in the uppermost part of the determination portion 8, increases toward the lower part of the determination portion 8 and becomes the highest in the lowermost part. Specifically, the determination portion 8 is configured such that the upper part is a low chroma region 8a and the lower part is a high chroma region 8b. The low chroma region 8a is defined to have chroma levels lower than the upper limit of chroma displayable on the image display device 4 and at least a portion of the high chroma region 8b is defined to have chroma levels higher than the upper limit of chroma displayable on the image display device 4.

Figure 10:
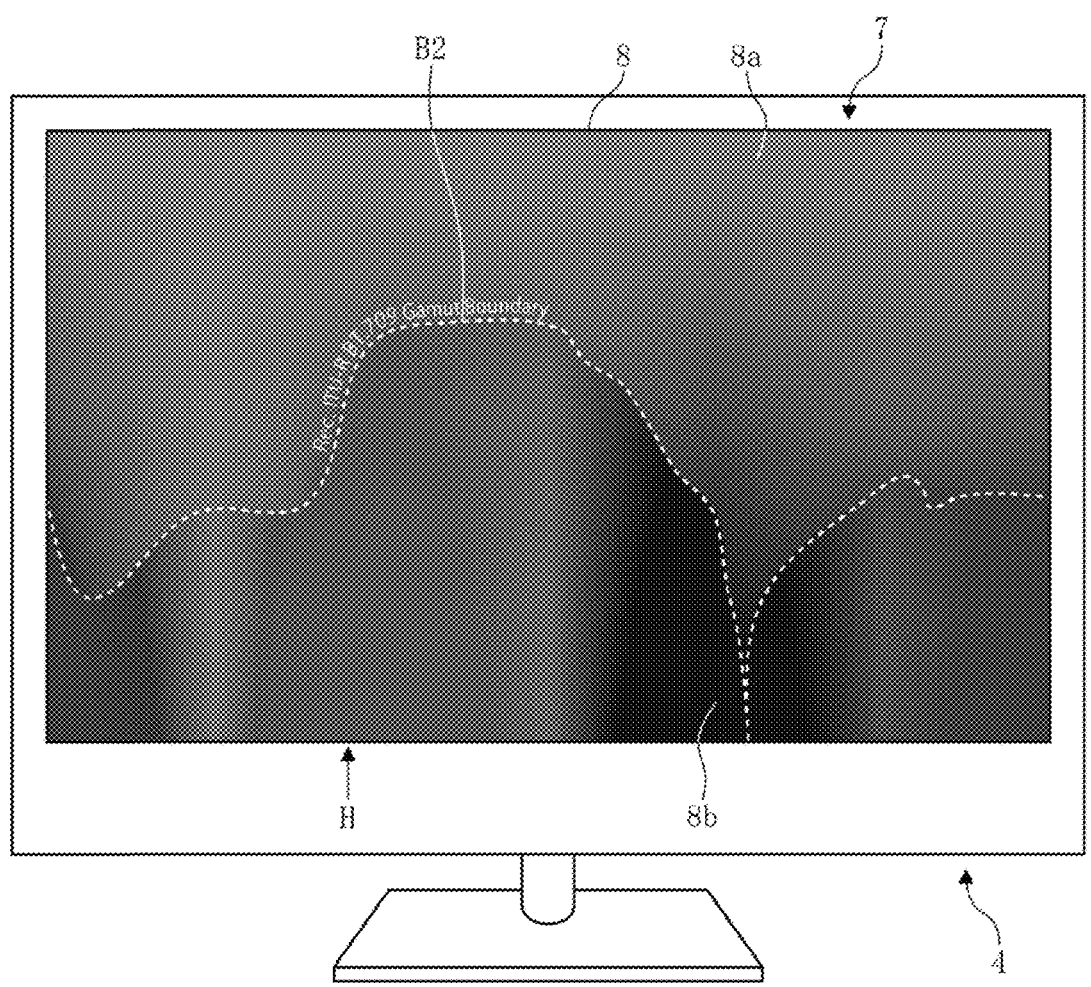
FIG. 10 is a schematic view showing how the chromaticity evaluation image used in the embodiment looks when displayed on the image display device.

An example of how the chromaticity evaluation image 7 defined as such and actually displayed on the image display device 4 looks is shown in FIG. 10.

The chromaticity evaluation image 7 is defined by a standard called ultra-high-definition television or the like, such as ITU-R BT.2020, in which the color gamut is considerably expanded in comparison with that in a conventional high-definition television. If the chromaticity evaluation image 7 is attempted to be displayed on the image display device 4, for example, designed in accordance with the standard of conventional ITU-R BT.709 and capable of only reproducing the color gamut range defined by the standard of BT.709, a portion that cannot display a color with its correct chroma will be generated in a region defined to have high chroma in the determination portion 8. Thus, though chroma rises progressively, for example, from the uppermost part toward the lower side in the determination portion 8 of the chromaticity evaluation image 7 displayed on the image display device 4, displayable maximum chroma on the image display device 4 is reached at a certain position, and video signals defined by higher chroma levels are clipped and displayed with the same chroma in portions lower than that position. As a result, exemplarily as shown in FIG. 10, how the regions look is such that chroma changes continuously along the vertical direction in the region on the upper side of the boundary B2 while the chroma is saturated and is displayed in a squashed manner by the displayable maximum chroma in the region on the lower side of the boundary B2.

A position at which displayable maximum chroma is reached on the image display device 4 differs depending on the hue. For example, there is a characteristic that a certain hue close to red can be reproduced up to chroma defined fairly high whereas a certain hue close to green can be only displayed up to chroma defined relatively low. Thus, the boundary B2 does not become a straight line in the horizontal direction and has a shape, for example, as shown in FIG. 10. In this manner, the limit of color gamut displayable on the image display device 4 can be visually grasped as the position of the boundary B2.

Figure 11:
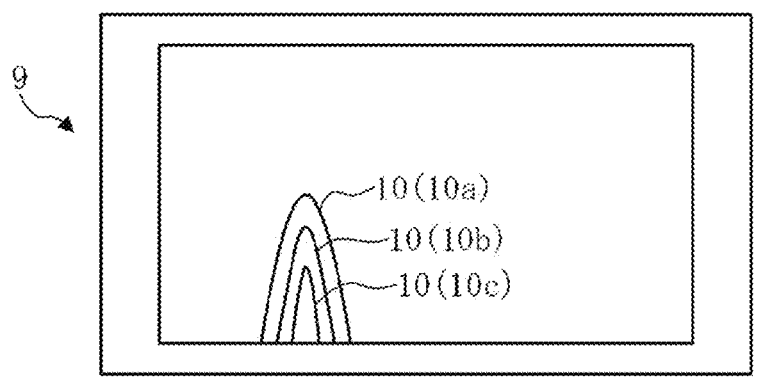
FIG. 11 is a view showing an example of a scale used in the embodiment.

After the position of the boundary B2 in the determination portion 8 is grasped, then the scale 9, for example, as shown in FIG. 11 is superimposed on the chromaticity evaluation image 7. The scale 9 includes the scale marks 10 (10a-10c) at positions corresponding to a specific hue H (shown by an arrow in FIG. 10) in the high chroma region 8b in the lower part of the determination portion 8.

The scale marks 10a-10c are drawn on the scale 9, for example, in the form of isosceles-triangles each having a vertex at a position corresponding to the specific hue H and having the lowermost part of the determination portion 8 as its base. Selected as the specific hue H is, for example, a hue which is technically difficult to display with especially high chroma in an image display device in general use.

Specifically, as mentioned above, the displayable maximum chroma on the image display device 4 differs depending on the hue. The position of the boundary B2 in a certain hue is on the low chroma region 8a side, which is the relatively upper side in the determination portion 8; that in another hue is on the high chroma region 8b side, which is the relatively lower side in the determination portion 8. When presuming a hue H especially difficult to display with high chroma on the image display device 4, the boundary B2 is positioned especially upside in the position of the hue H; a hue adjacent to the hue H can be displayed with chroma higher than that for the hue H so that the position of the boundary B2 is lower than the position thereof in the hue H. Thus, theoretically, the boundary B2 is believed to form a shape close to an isosceles triangle having a vertex at the position of the hue H in a region near the hue H. Based on such a presumption, the scale marks 10a-10c are provided on the scale 9 while setting the position corresponding to the hue H as the center, so as to evaluate the characteristics of the image display device 4 by using the display limit of chroma regarding the hue H as a rough standard.

Actually, other than hue H, there are a variety of hues difficult to be displayed with high chroma so that the shape of the boundary B2 does not necessarily form an isosceles triangle near the hue H, as shown in FIG. 10. However, even if the boundary B2 has a shape as shown in FIG. 10, it is possible to evaluate the characteristics of the image display device 4 using the display limit of chroma regarding the hue H as rough standard, by observing the position of the boundary B2 with respect to the scale marks 10a-10c.

Figure 12:
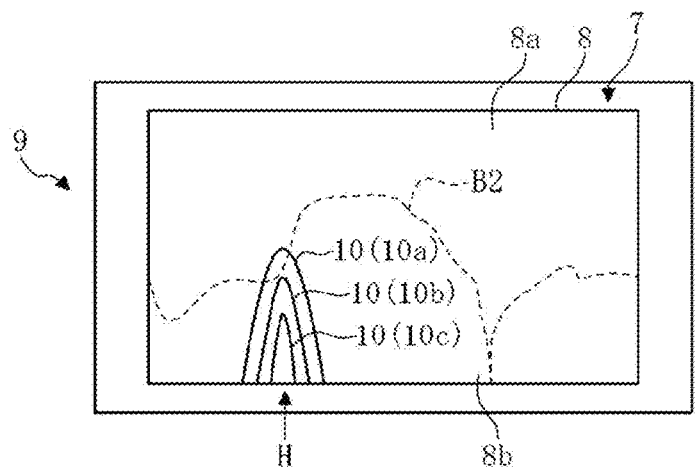
FIG. 12 is a view showing an example of a position relationship between scale marks of the scale and a boundary in a chromaticity evaluation image used in the embodiment.
Figure 13:
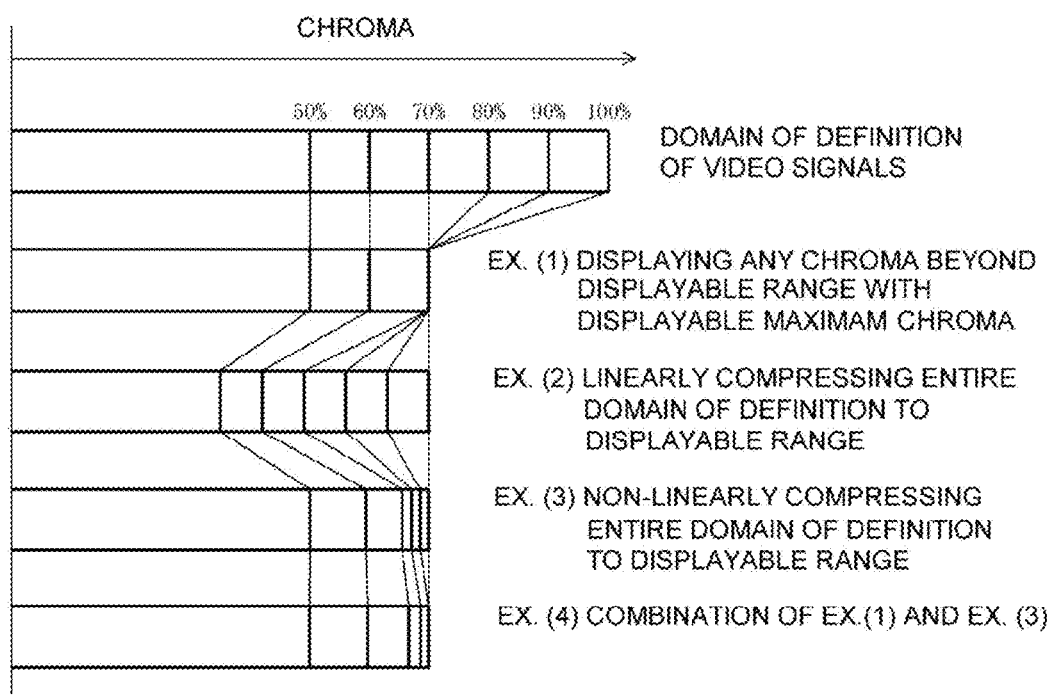
FIG. 13 is a view illustrating a relationship between display performance of the image display device and a domain of definition of video signals.

For example, suppose that, in display of the chromaticity evaluation image 7 on the image display device 4, the boundary B2 in the determination portion 8 is at the position as shown in FIG. 12 and that, in superposition of the scale 9 thereon, the boundary B2 is at the position as shown in FIG. 12 with respect to the scale marks 10a-10c and is between the scale marks 10a and 10b near the position of the hue H. Suppose that the scale marks 10a, 10b and 10c indicate, for example, 50%, 60% and 70% of the maximum chroma definable by ITU-R BT.2020 regarding the hue H, respectively. Then, it can be determined that the image display device 4 displays the hue H up to 50% or higher but less than 60% chroma in a domain of definition of ITU-R BT.2020 without clipping.

When video signals defined by a color gamut exceeding the display performance of the image display device 4 are to be input to the image display device 4, there are various ways or alternatives in how to display. Presumed, for example, is the image display device 4 capable of displaying a certain hue up to 70% chroma at a maximum with respect to the domain of definition of video signals. The image display device 4 may have a specification of performing display faithfully to video signals up to 70%, which is the limit of the display performance, and clipping and displaying any higher chroma with the same chroma as shown, for example, in example (1) in FIG. 13. In this case, the boundary B2 in the chromaticity evaluation image 7 appears as a limit of chroma displayable on the image display device 4 (a line indicating 70% of the maximum chroma defined).

Alternatively, as shown in example (2), the entire domain of definition can be linearly compressed in conformity to the displayable range of the image display device. In this case, the boundary B2 does not appear in the chromaticity evaluation image 7, and characteristics of the image display device 4 cannot be evaluated using the chromaticity evaluation image 7 (this alternative, which impairs chroma throughout the entire area of a video being displayed, seems to be less likely to be applied to actual image display devices).

Alternatively, as shown in example (3), the entire domain of definition may be non-linearly compressed so as to display chroma up to a certain level faithfully to the video signals and display any further chroma with strong compression such that the video signal defined as the maximum chroma corresponds to the limit of chroma displayable on the image display device 4. In this case, whether the boundary B2 appears or not depends on strength of the compression degree in the high chroma region 8b. Specifically, if the compression degree in the high chroma region 8b is weak, it is considered that the boundary B2 does not appear in the chromaticity evaluation image 7. If the compression degree is strong, it is considered that a region displayed in a squashed manner substantially similar to the clipped region as shown in FIG. 10 appears in the high chroma region 8b and that the boundary B2 can be observed.

Example (4) is an example of a compression way or technique by combining examples (1) and (3). In this technique, video signals are strongly compressed in a region defined to have high chroma whereas a region defined to have especially high chroma is clipped such that as a whole, up to 90% of the domain of definition is partially compressed for display. In this case, the boundary B2 in the chromaticity evaluation image 7 appears as a line indicating 90% of the maximum chroma defined, and it can be understood that the image display device 4 clips video signals defining 90% or higher chroma in the domain of definition. In this manner, the chromaticity evaluation image 7 can be used to evaluate in what kind of range video signals are clipped on the image display device 4.

Figure 14:
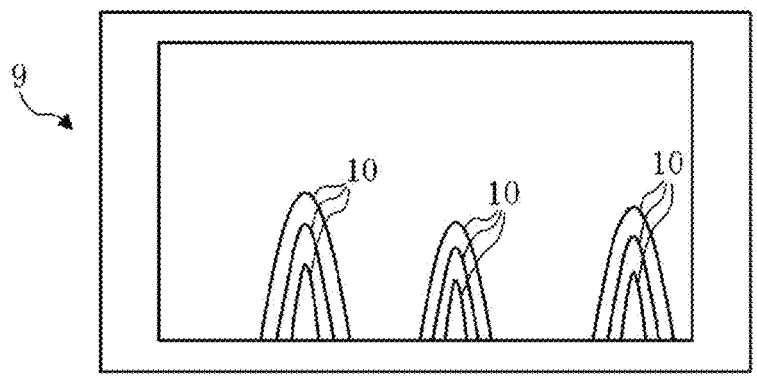
FIG. 14 is a view showing a further example of the scale used in the embodiment.

For convenience of explanation, the illustration has been made on a case where three scale marks 10a-10c are provided on the scale 9 at the position corresponding to the hue H; it is of course that the number of the scale marks 10 may be larger or smaller than three. Settable as the hue H is not necessarily one hue. For example, as shown in FIG. 14, settable are a plurality of hues (for example, three colors) for each of which display performance is desired to be determined on the image display device 4; the scale marks 10 may be provided at a plurality of positions on the scale 9 corresponding to the hues to evaluate the characteristics of the image display device 4 on each of the hues.

Though not shown, scale marks with shapes other than isosceles triangles may be provided on the scale. For example, when attempting to set scale marks covering all of the hues rather than measuring display performance concerning only a specific hue using the scale marks 10 as mentioned above, scale marks with shapes, for example, close to that of the boundary B2 as shown in FIG. 10 or 12 may be provided on the scale. Scale marks may take various configurations as long as the display performance of the image display device 4 can be grasped as a position relationship with the boundary B2 in the determination portion 8.

As in the case of the aforementioned scale 5 (see FIG. 5) corresponding to the luminance evaluation image 1, the scale 9 may be, for example, in the form of a transparent sheet with the scale marks 10 printed thereon so as to be superimposed on the screen of the image display device 4 for reading of the position of the boundary B2 with respect to the scale marks 10. Alternatively, for example, the scale 9 may be configured as image data displayed superimposedly on the chromaticity evaluation image 7 by an operation of a user after the position of the boundary B2 is grasped. In this connection, the scale 9 is preferably superimposed on the chromaticity evaluation image 7 after the position of the boundary B2 is grasped, which prevents the scale marks 10 from impeding visual recognition of the boundary B2. Alternatively, the scale 9 may be prepared as a separate image from the chromaticity evaluation image 7 and displayed by switching the display after the position of the boundary B2 in the chromaticity evaluation image 7 is grasped. Alternatively, without using a sheet or an image of the scale 9, a measurer may use a ruler or the like (not shown) on the screen of the image display device 4 to numerically grasp the position of the boundary B2 and properly convert the same into a numerical value to evaluate the display performance of chroma on the image display device 4.

Though the explanation has been made on the example of the chromaticity evaluation image 7 with the rectangular determination portion 8 having the upper side configured as the low chroma region 8a and the lower side configured as the high chroma region 8b, the shape of the determination portion 8 and the distribution of hue/chroma are not limited thereto. For example, it is possible to configure the determination portion 8 as a circle with a central part configured as the low chroma region 8a and a circumference configured as the high chroma region 8b. The determination portion 8 and the chromaticity evaluation image 7 may take various configurations as long as the limit of chroma displayable on the image display device 4 can be grasped as the boundary B2 by visual observation.

Figure 15:
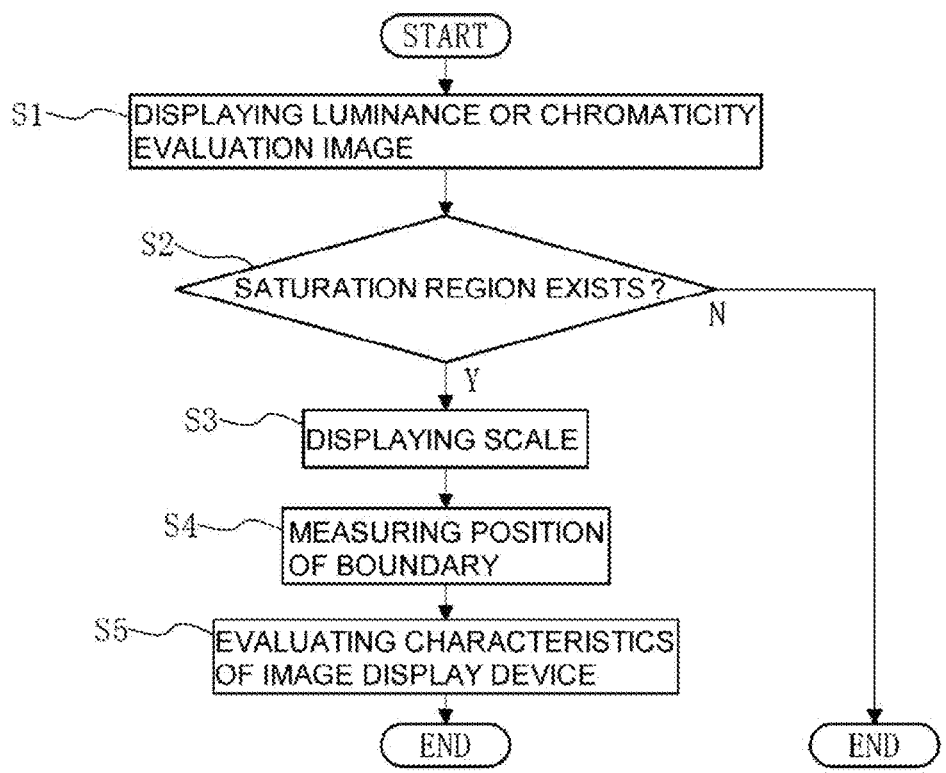
FIG. 15 is a flowchart illustrating procedures of the invention.

FIG. 15 is a flowchart showing an example of procedures for evaluating the performance of the image display device 4, using the luminance evaluation image 1 or/and the chromaticity evaluation image 7 as mentioned above.

In evaluating the performance of the image display device 4, first in step S1, the luminance evaluation image 1 or the chromaticity evaluation image 7 is displayed on the image display device 4 (see FIG. 3 or 10). Then, determined in step S2 is whether a region with luminance saturation or chroma saturation exists or not in the determination portion 3 or 8 displayed. If there is no region with luminance saturation or chroma saturation, it is determined that the display performance regarding luminance or chromaticity of the image display device 4 cannot be evaluated with the luminance evaluation image 1 or the chromaticity evaluation image 7, and the process is completed.

If a region with luminance saturation or chroma saturation is seen in the determination portion 3 or 8, the scale 5 or 9 (see FIG. 5 or 11) is displayed on the image display device 4 in step S3. Alternatively, the scale 5 or 9 is superimposed on the luminance evaluation image 1 or the chromaticity evaluation image 7 displayed on the image display device 4.

Subsequently, read in step 4 is a value of the scale marks 6 or 10 corresponding to the position of the boundary B1 or B2 observed on the determination portion 3 or the determination portion 8. Evaluated in step S5 from the value read in step S4 are characteristics regarding luminance or chromaticity of the image display device 4. Thus, the process is completed.

A method for evaluating performance of an image display device according to the invention is not limited to the procedures as shown in FIG. 15. For example, step S3 is unnecessary in evaluation of luminance, provided that the scale marks 6 are displayed on the luminance evaluation image 1 in advance as shown in FIG. 6. Step S3 is unnecessary also in a case where the position of the boundary B1 or B2 is, for example, manually measured using a ruler or the like instead of using the scale 5 or 9.

It is also possible to display both the luminance evaluation image 1 and the chromaticity evaluation image 7 on the image display device 4 at once. In this case, each of the aforementioned steps may be concurrently executed concerning both the luminance and chromaticity.

Thus, according to the embodiment, the performance of the image display device 4 can be intuitively grasped in the form of the position of the boundary B1 or B2 with the visual sense of a user. Thus, an instrument such as a luminance meter or chromaticity meter is unnecessary, and the procedures required for the evaluation of performance are also fewer and thus simple.

Figure 16:
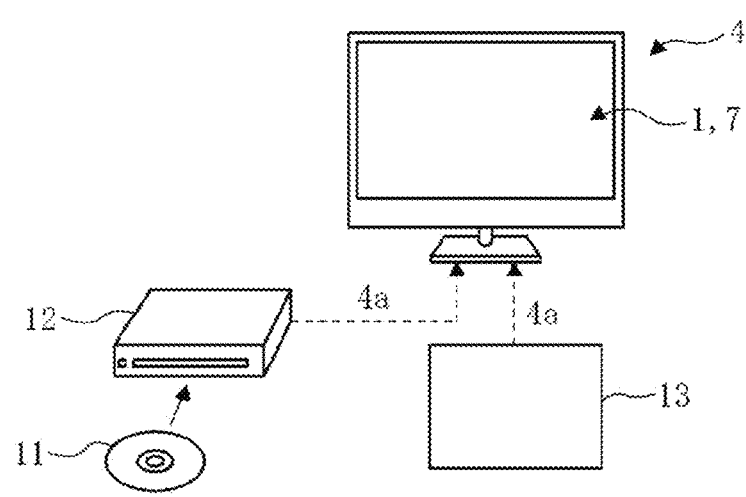
FIG. 16 is a view showing an outline of a system according to the invention.

FIG. 16 shows a system for evaluating performance of an image display device using the luminance evaluation image 1 (see FIG. 1) or the chromaticity evaluation image (see FIG. 9) as mentioned above. For example, the luminance evaluation image 1 or the chromaticity evaluation image 7 recorded on a storage medium 11 such as DVD-ROM or USB memory is input as video signals 4a to the image display device 4 via a reproducing device 12, and is displayed on the image display device 4. Then, the aforementioned method for evaluating performance of an image display device can be executed by switching the display among the images such as the luminance evaluation image 1 and the chromaticity evaluation image 7 and also the scales 5 and 9, by an operation of a user.

The storage medium 11 may record images such as the luminance evaluation image 1 and the chromaticity evaluation image 7, and the scales 5 and 9, as image data. Alternatively, the storage medium 11 may record images in the form of an application in which the display of these images can be operated.

Alternatively, without using the storage medium 11 as mentioned above, for example, a communicating device 13 may be used to externally receive data of the luminance evaluation image 1 or the chromaticity evaluation image 7 through Internet connection or the like and input the received data as the video signals 4a to the image display device 4.

As is clear from the above, in the above-mentioned embodiment, at least either the luminance evaluation image 1 or the chromaticity evaluation image 7 is displayed on the image display device 4, the lamination evaluation image 1 having the determination portion 3 configured such that luminance changes progressively between the low luminance region 3a defined to have luminance levels lower than the upper limit of luminance displayable on the image display device 4 and the high luminance region 3b defined to have luminance levels higher than the upper limit of luminance displayable on the image display device 4, the chromaticity evaluation image 7 having the determination portion 8 configured such that chroma changes progressively between the low chroma region 8a defined to have chroma levels lower than the upper limit of chroma displayable on the image display device 4 and the high chroma region 8b defined to have chroma levels higher than the upper limit of chroma displayable on the image display device; and the characteristics of the image display device 4 are evaluated from the position of the boundary B1 or B2 of a luminance or chroma saturation region in the determination portion 3 in the luminance evaluation image 1 or the chromaticity evaluation image 7. In this manner, the performance of the image display device 4 can be grasped in the form of the position of the boundary B1 or B2.

In the embodiment, the luminance evaluation image 1 is defined by SMPTE ST2084 or ARIB STD-B67. Thus, the luminance evaluation image 1 can be defined in a wide luminance range, and the display performance on the luminance of the image display device 4 can be favorably evaluated.

In the embodiment, the chromaticity evaluation image 7 is defined by ITU-R BT.2020. Thus, the chromaticity evaluation image 7 can be defined in a wide color gamut, and the display performance on the chromaticity of the image display device 4 can be favorably evaluated.

Thus, according to the above-described embodiment, performance of the image display device can be simply and intuitively evaluated.

It is to be understood that the method and the system for evaluating performance of an image display device according to the invention is not limited to the above embodiment and that various changes and modifications may be made without departing from the scope of the invention.

REFERENCE SIGNS LIST 1 luminance evaluation image
3 determination portion
3a low luminance region
3b high luminance region
4 image display device
7 chromaticity evaluation image
8 determination portion
8a low chroma region
8b high chroma region
B1 boundary
B2 boundary

The invention claimed is:

1. A method for evaluating performance of an image display device, which comprises:
   displaying at least either a luminance evaluation image or a chromaticity evaluation image on said image display device, said luminance evaluation image having a determination portion configured such that luminance changes progressively between a low luminance region defined to have luminance levels lower than an upper limit of luminance displayable on said image display device and a high luminance region defined to have luminance levels higher than the upper limit of luminance displayable on said image display device, said chromaticity evaluation image having a determination portion configured such that chroma changes progressively between a low chroma region defined to have chroma levels lower than an upper limit of chroma displayable on said image display device and a high chroma region defined to have chroma levels higher than the upper limit of chroma displayable on said image display device; and
   evaluating characteristics of the image display device from a position of a boundary of the luminance or chroma saturation region in the determination portion of said luminance or chroma evaluation image.

2. The method for evaluating performance of the image display device according to claim 1, wherein said luminance evaluation image is defined by SMPTE ST2084 or ARIB STD-B67.

3. The method for evaluating performance of the image display device according to claim 1, wherein said chromaticity evaluation image is defined by ITU-R BT.2020.

4. A system for evaluating performance of an image display device configured to execute the method for evaluating performance of the image display device according to claim 1.

5. A system for evaluating performance of an image display device configured to execute the method for evaluating performance of the image display device according to claim 2.

6. A system for evaluating performance of an image display device configured to execute the method for evaluating performance of the image display device according to claim 3.

* * * * *